(12) United States Patent
Feng et al.

(10) Patent No.: US 7,930,311 B2
(45) Date of Patent: Apr. 19, 2011

(54) DATA CLASSIFICATION SYSTEM AND METHOD FOR BUILDING CLASSIFICATION TREE FOR THE SAME

(75) Inventors: Shih-An Feng, Hsinchu County (TW); Tsung-Jen Huang, Taichung (TW); Yi-Ching Liaw, Changhua County (TW); Chih-Tang Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 370 days.

(21) Appl. No.: 12/046,471

(22) Filed: Mar. 12, 2008

(65) Prior Publication Data
US 2009/0172010 A1  Jul. 2, 2009

(30) Foreign Application Priority Data
Dec. 28, 2007  (TW) .............................. 96151046 A

(51) Int. Cl.
*G06F 7/00* (2006.01)
(52) U.S. Cl. ........................................ 707/758; 707/829
(58) Field of Classification Search .................. None
See application file for complete search history.

(56) References Cited

U.S. PATENT DOCUMENTS

| | | | |
|---|---|---|---|
| 7,046,285 B2 | 5/2006 | Miyagi et al. | |
| 7,203,300 B2* | 4/2007 | Shaffer et al. | 707/999.1 |
| 2004/0204821 A1* | 10/2004 | Tu | 701/200 |
| 2005/0060299 A1 | 3/2005 | Filley et al. | |
| 2005/0076056 A1* | 4/2005 | Paalasmaa et al. | 707/104.1 |
| 2006/0053176 A1* | 3/2006 | Thorpe et al. | 707/203 |
| 2007/0211151 A1* | 9/2007 | Baiping et al. | 348/231.2 |
| 2007/0250476 A1* | 10/2007 | Krasnik | 707/2 |
| 2007/0255552 A1* | 11/2007 | Thiesson et al. | 704/8 |
| 2008/0101019 A1* | 5/2008 | Tao | 361/695 |
| 2008/0104019 A1* | 5/2008 | Nath | 707/3 |
| 2008/0189331 A1* | 8/2008 | Lee et al. | 707/104.1 |

FOREIGN PATENT DOCUMENTS
JP  2007-122111  5/2007

\* cited by examiner

*Primary Examiner* — Debbie Le
*Assistant Examiner* — Thomas Meng
(74) *Attorney, Agent, or Firm* — Jianq Chyun IP Office

(57) ABSTRACT

A data classification system is provided. The data classification system includes a fetch unit, a classification tree module, and a data repository. The fetch unit is adapted for receiving data including at least one datum, and fetching a data information contained in the data. The classification tree module is adapted for classifying the data in a manner of a tree structure according to the data info illation, and building a classification tree thereby. The data repository is adapted for storing the classification tree and the data.

20 Claims, 15 Drawing Sheets

| Latitude | Longitude | Type Code | File Name |
|---|---|---|---|
| 37.65.152 | 135.72.225 | 14000000 | Dsc00005.jpg |
| 37.66.250 | 135.65.105 | 14000000 | Dsc00006.jpg |
| 37.66.251 | 135.65.104 | 14000000 | Dsc00007.jpg |
| 37.66.255 | 135.64.780 | 04000000 | Ssp00001.jpg |
| 37.66.251 | 135.63.330 | 05000000 | Shp00001.jpg |

| Item | Illustration |
|---|---|
| Position | Coordinate Information of the Data |
| Time | Building Time of the Data |
| Type | Type of the Data |
| Description | Description of the Data |
| Importance | Importance Ranking of the Data |
| ImageLink | Storage Position Reference Information of the Data |

FIG. 3A

| Serial Number | Item | Serial Number | Item |
|---|---|---|---|
| 01 | Canteen | 06 | Hospital |
| 02 | View Site | 07 | School |
| 03 | Shop | 08 | Playground |
| 04 | Depot | 09 | Park |
| 05 | Airport | 10 | Night Market |

FIG. 3B

| Item | Illustration |
|---|---|
| Distance | Maximum Distance of Data in the Node from the Center Position of the Node |
| Center | Center Position of the Node (Coordinate Information) |
| Count | Data Amount in the Node |
| Importance | Importance Ranking of the Node |
| Image | Data Listing of the Node |
| Description | Description of the Node |
| Subnode 1 | First Sub-node |
| Subnode 2 | Second Sub-node |

| Data | Type of the Data |
|------|------------------|
| D1   | A                |
| D2   | B                |
| D3   | A                |
| D4   | C                |

FIG. 17

DATA CLASSIFICATION SYSTEM AND METHOD FOR BUILDING CLASSIFICATION TREE FOR THE SAME

CROSS-REFERENCE TO RELATED APPLICATION

This application claims the priority benefit of Taiwan application serial no. 96151046, filed on Dec. 28, 2007. The entirety of the above-mentioned patent application is hereby incorporated by reference herein and made a part of this specification.

BACKGROUND OF THE INVENTION

1. Field of the Invention

The present invention generally relates to a data classification system and a method for building a classification tree for the same.

2. Description of Related Art

Recently, broadband network services and digital camera (DC) products are already popular, which allows uploading personal digital photographs (data) to the internet for storage and sharing the same with others. In fact, as the related environment and technology become more mature and supportive, more and more people would feel comfortable to upload personal digital photographs (data) to the internet for storage for sharing with others. As such, how to more effectively manage, browse, and search photographs becomes an important concern with the booming quantity of digital photographs.

On the other hand, a digital photograph, when in conjunction with a global positioning system (GPS), may even be used to obtain geographical information, e.g., coordinate data such as longitude and latitude of the position of the photographed object in addition to the image data thereof. Currently, there are some websites such as Google Earth and Yahoo Map providing photographs in correspondence with the geographical information thereof at convenient positions of a map, so as to allow users to view pictures photographed at predetermined positions when viewing the map of the predetermined position. In this manner, it is a key role to effectively classify the photographs according to the geographical information thereof, and improve a writing/reading efficiency of the photographs for related applications of the geographical information.

In order to achieve an object of browsing photographs according to the geographical information thereof, U.S. Pat. No. 7,046,285 proposes to create a descriptive table, as shown in FIG. 1. Referring to FIG. 1, each row represents related descriptive information including longitude, latitude, type and file name of a photograph. When using the foregoing descriptive tables, an application program displays the photograph at a suitable position of the map.

However, despite the convenience and easiness of using such tables to store the information of the photograph, the storage of the photograph is irrelevant with relative distances of adjacent photographs. Therefore, with the teaching of U.S. Pat. No. 7,046,285, one can not effectively fetch a photograph of an adjacent position, and a longer time is required for searching more photographs.

SUMMARY OF THE INVENTION

Accordingly, the present invention is directed to a data classification system, and a method for building a classification tree for the same, and thus providing a hierarchical structure for accelerating a data searching speed, and obtaining a capability of data integration.

The present invention provides a data classification system. The data classification system includes a fetch unit, a classification tree module, and a data repository. The fetch unit is adapted for receiving data including at least one datum, and fetching a data information contained in the data. The classification tree module is adapted for classifying the data in a manner of a tree structure according to the data information, and building a classification tree thereby. The data repository is adapted for storing the classification tree and the data.

The present invention provides a method for building the classification tree, including the following steps. First, data including at least one datum is obtained, wherein each of the data corresponding to a coordinate information. Next, the data is added into a node. Next, a center position of the node is calculated according to the coordinate information corresponding to the data. Next, a distance of the coordinate information of each of the data to the center position is calculated, and a maximum distance is obtained. Next, it is determined whether the maximum distance is greater than a predetermined distance, wherein if it is determined that the maximum distance is greater than a predetermined distance, the node is divided into a first sub-node and a second sub-node, and the data is added to one of the first sub-node and the second sub-node according to the coordinate information corresponding to each of the data.

The present invention builds a classification tree by classifying in a manner of a tree structure, e.g., a binary tree, according to coordinate information recorded in the data. In other words, data added in the node can be divided into two groups according to the coordinate information of the data. The two groups are added to two sub-nodes respectively. Similarly, data in each sub-node can be further divided into two groups until each sub-node containing only one datum or otherwise a distance from each datum in the sub-node to a center position being smaller than a predetermined distance. In such a way, the classification tree built according to the present invention provides a hierarchical structure which is adapted to provide an optimal writing/reading speed for applications in information browsing and searching according to the coordinate information, and accelerate the searching speed. Further, the present invention is also adapted for searching data corresponding to predetermined searching conditions according to the data information of the data.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A is a schematic diagram illustrating contents of data information of the data.

FIG. 3B is a schematic diagram illustrating contents of different types of the data.

FIG. 17 is a schematic diagram illustrating a data amount and types of data included in a node according to an embodiment of the present invention.

DESCRIPTION OF THE EMBODIMENTS

Figures 1, 2:
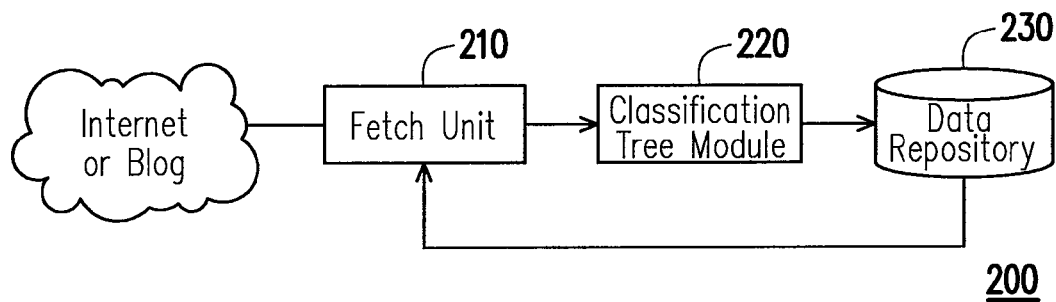
FIG. 1 is a schematic diagram illustrating a descriptive table of a conventional technology.
FIG. 2 is a schematic diagram illustrating a data classifications system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 2 is a schematic diagram illustrating a data classifications system according to an embodiment of the present invention. Referring to FIG. 2, a data classification system 200 includes a fetch unit 210, a classification tree module 220, and a data repository 230. The fetch unit 210 is adapted for receiving data including at least one datum, and fetching a data information contained in the data. The data can be a digital photograph or the like. The classification tree module 220 is adapted for classifying the data according to the data information and a manner of a tree structure, e.g., a binary tree. Then, the classification tree module 220 builds a classification tree according the above-mentioned classifying result. The data repository 230 is adapted for storing the classification tree and the data.

According to an aspect of the embodiment, the data can be fetched either from the data repository 230, or from Internet or a blog. According to another aspect of the embodiment and as shown in FIG. 3A, the data information includes coordinate information, building times, types, descriptions, importance rankings, storage position reference information of the data. The coordinate information of the data may include a longitude and a latitude, which can be accorded by the classification tree module 220 in classifying photographs. The longitude and the latitude can be obtained by a global positioning system (GPS).

The importance ranking of the data can be determined by an input by an administrator or a click rate thereof. The types of the data may include canteen, view site, shop, depot, airport, hospital, school, playground, park, night market as shown in but not restricted by FIG. 3B.

Figures 3C, 4:
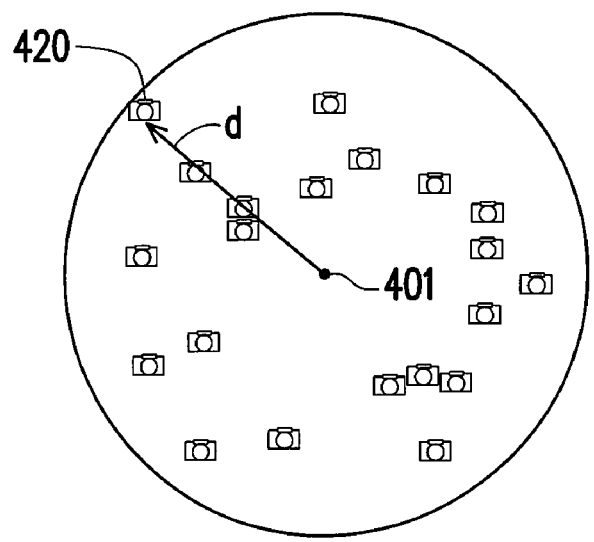
FIG. 3C is a schematic diagram illustrating information contents of data in a node.
FIG. 4 is a schematic diagram illustrating a distribution of data in a node and a positional relationship therebetween.

According to an embodiment of the present invention, the classification tree includes a plurality of nodes, each including a maximum distance of the data in the node to a center position of the node, the center position, data amount in the node, importance ranking of the node, data listing in the node, description of the node, sub-nodes of the node, e.g., sub-node 1 and sub-node 2, as shown in FIG. 3C.

The maximum distance of the data in the node to the center position of the node, and the center position can be obtained according to the coordinate information of the data in the node, as shown in FIG. 4. Referring to FIG. 4, a center position 401 is a geometric center obtained by calculating the coordinate information, (i.e., longitudes and latitudes) of the data in the node. Then, coordinate information of each datum is calculated with the center position to obtain the maximum distance d of the data to the center position (i.e., a distance from a datum 420 to the center position 401 hereby). Further, the importance ranking of the node can be obtained by data collection of a data group, or determined by the administrator.

It should be noted that different colors are preferably employed hereby for identifying the importance ranking of the node. For example, red color represents a very important node; green color represents a medium important node, and blue color represents a less important node. Data amount in the node can be identified from a size of the node. For example, a larger node indicates that the node contains more data, and a smaller node indicates that the node contains less data.

For example, a large red node indicates that the node contains a large amount of very important data, while a small blue node indicates that the node contains a small amount of unimportant data. The description of the node can be set by the administrator, or key words derived from an automatic statistic analysis of using frequencies of words presented in the group, so as to allow the user to rapidly find out desired data with the facilitation of the description of the node.

Figure 5:
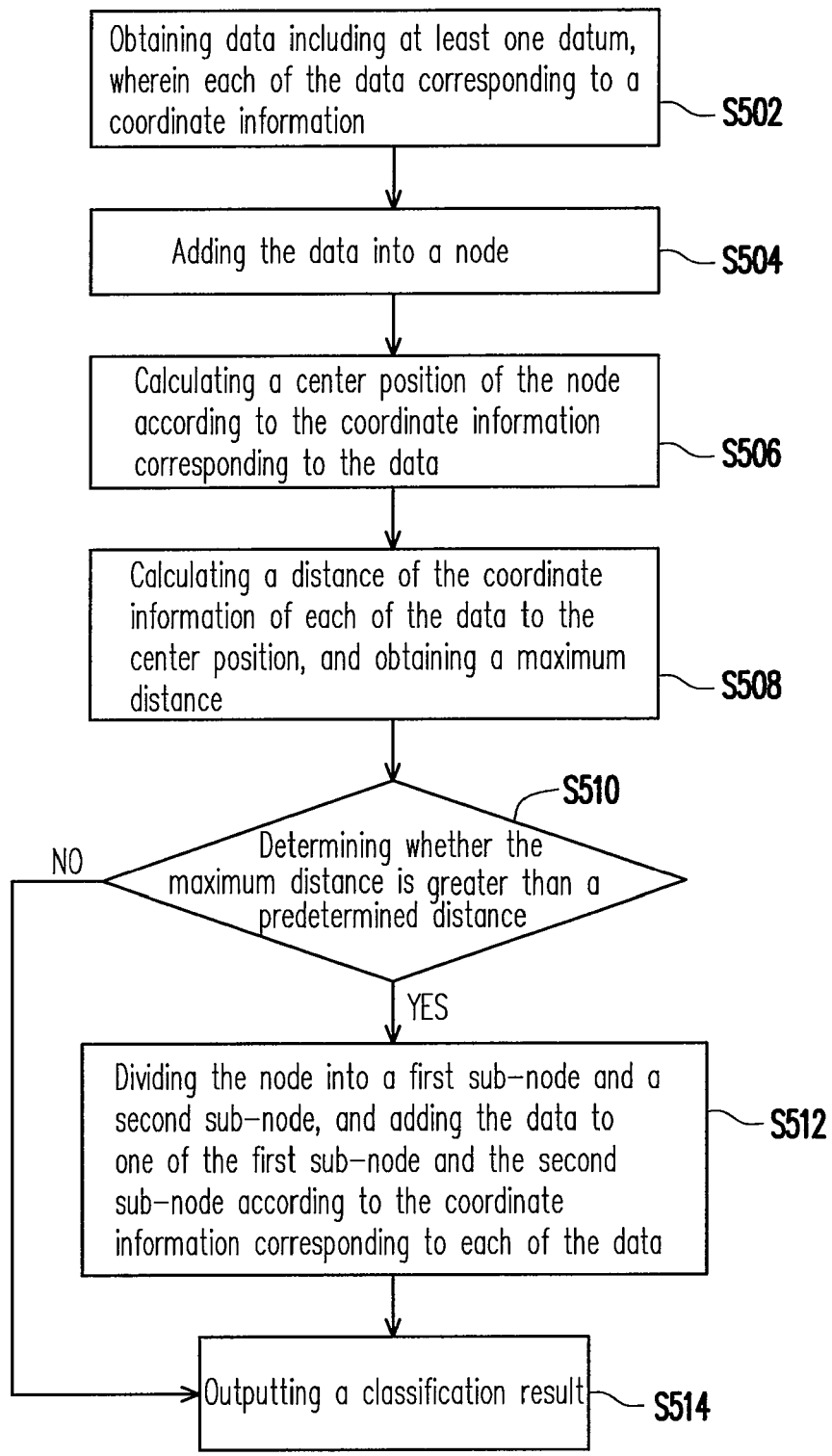
FIG. 5 is a flow chart illustrating a method for building a classification tree according to an embodiment of the present invention.

FIG. 5 is a flow chart illustrating a method for building a classification tree according to an embodiment of the present invention. Referring to FIG. 5, first, at a step S502, data including at least one datum is obtained, each corresponding to a coordinate information. The coordinate information, for example, includes a longitude and a latitude of the datum. At step S504, each of the data is added into a node. The node, for example, but not restricted as a root node.

At step S506, a center position of the node is calculated according to the coordinate information of each of the data. The center position is a geometric center calculated according to the coordinate information of each of the data, as indicated by the legend 401 as shown in FIG. 4.

At step S508, the maximum distance is obtained by calculating the distance of the coordinate information of each datum to the center position, in which distances of all of the data to the center position are calculated and a maximum value is selected therefrom and is accorded in determining whether the data in the node need to be divided.

At step S510, it is determined whether the maximum distance is greater than a predetermined distance, for example, 1 km, and a calculated maximum distance of 0.8 km, it would thus be determined that the maximum distance is not greater than the predetermined distance. Or otherwise, if it is calculated that the maximum distance is 1.3 km, it would thus be determined that the maximum distance is greater than the predetermined distance.

If it is determined that the maximum distance is greater than the predetermined distance, then at step S512, the node is divided into a first sub-node and a second sub-node, and the data in the node are added into one of the first sub-node and the second sub-node according to the coordinate information corresponding to each of the data. Next, at step S514, the above classification result is outputted. If it is determined that the maximum distance is not greater than the predetermined distance, then the step S512 is passed over, and the process directly proceeds to the step S514.

Figure 6:
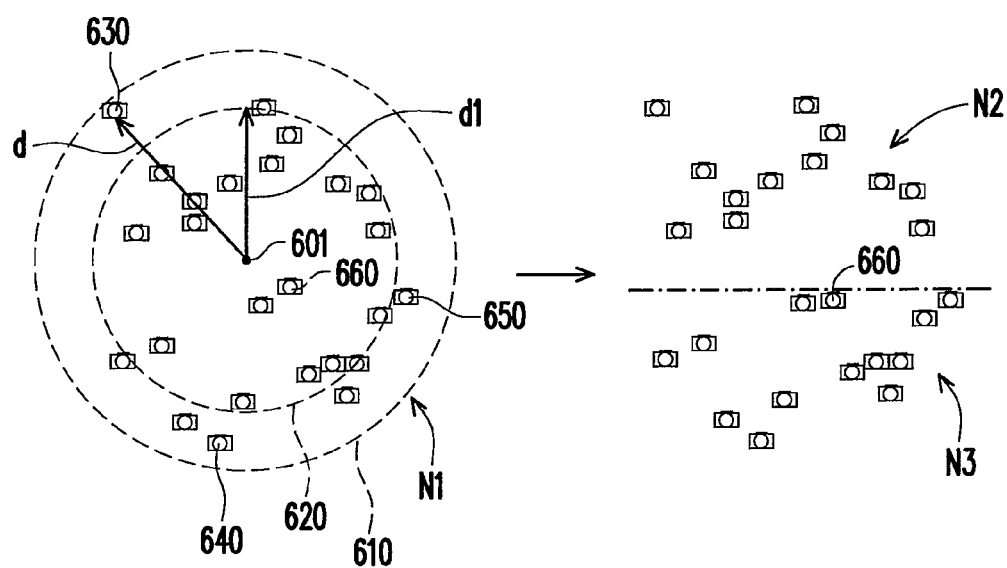
FIG. 6 is a schematic diagram showing dividing a node into a first sub-node and a second sub-node when it is determined that a maximum distance of data to a center position is greater than a predetermined distance.

An example is to be given herebelow for illustrating the process of determining the maximum distance is greater than the predetermined distance and then dividing the node into the first sub-node and the second sub-node. FIG. 6 is a schematic diagram showing dividing a node into a first sub-node and a second sub-node when it is determined that a maximum distance of data to a center position is greater than a predetermined distance. Referring to FIG. 6, in a node N1, assuming d is the maximum distance of all data in the node N1 to a center position 601 obtained by calculating the distances from all of the data to the center position 601, in which the dashed block 610 is a scope enclosed by the maximum distance d; d1 is a value of the predetermined distance, and the dashed block 620 is a scope enclosed by the predetermined distance d1. As shown in FIG. 6, it can be seen that the maximum distance d is greater than the predetermined distance d1. As such, the data in the node N1 is to be divided, in which longitudes and latitudes of all of the data in the node N1 are compared according to the coordinate information, so as to obtain maximum values of the longitudes and latitudes.

For example, two data whose longitudes are most distant in the node N1 are selected for calculation, in that data 630 and 640 are selected for a calculation about longitude. A maximum longitude difference, i.e., 20 degree, is then obtained. On the other hand, two data whose latitudes are most distant in the node N1 are selected for calculation, in that data 630 and 650 are selected for a calculation about latitude. A maximum latitude difference, i.e., 17 degree, is then obtained.

Accordingly, it can be learnt that in the node N1, the maximum longitude difference (20 degree) is greater than the maximum latitude difference (17 degree). Therefore, all data are arranged according to the longitudes of the data, and are divided into two groups. Preferably, a median of the longitudes of all of the data in the node N1, i.e., the longitude of datum 660 hereby is selected. Data having longitudes larger than the median are attributed to one group, and data having longitudes smaller than the median are attributed to another group. In such a way, the node N1 is divided into sub-nodes N2 and N3. Therefore, the maximum distance is effectively reduced which is helpful in building a clear hierarchic structure and thus accelerating the searching speed.

Preferably, the foregoing median can be selected with a process including: as shown in FIG. 6, ordering all data in the node N1 according to the values of the longitudes of the data; selecting a longitude of a data which is ordered at the most medium position, i.e., longitude of the datum 660, as the longitude median; and classifying all data in the node N1 into two groups according to the longitude of the datum 660, wherein those data whose longitudes are greater than the longitude of the datum 660 are classified as one group, e.g., node N2, and those data whose longitudes are smaller than the longitude of the datum 660 are classified as another group, e.g., node N3.

According to an aspect of the embodiment, if otherwise it is calculated that the maximum longitude difference is smaller than the maximum latitude difference, all data are arranged according to the latitudes of the data, and are divided into two groups. Preferably, a median of the latitudes of all of the data in the node is selected. The process of selecting the median of the latitudes is similar as taught above addressing to the process of selecting the median of the longitudes. Therefore, the maximum distance can also be effectively reduced which is helpful in building a clear hierarchic structure and thus accelerating the searching speed.

Figure 7:
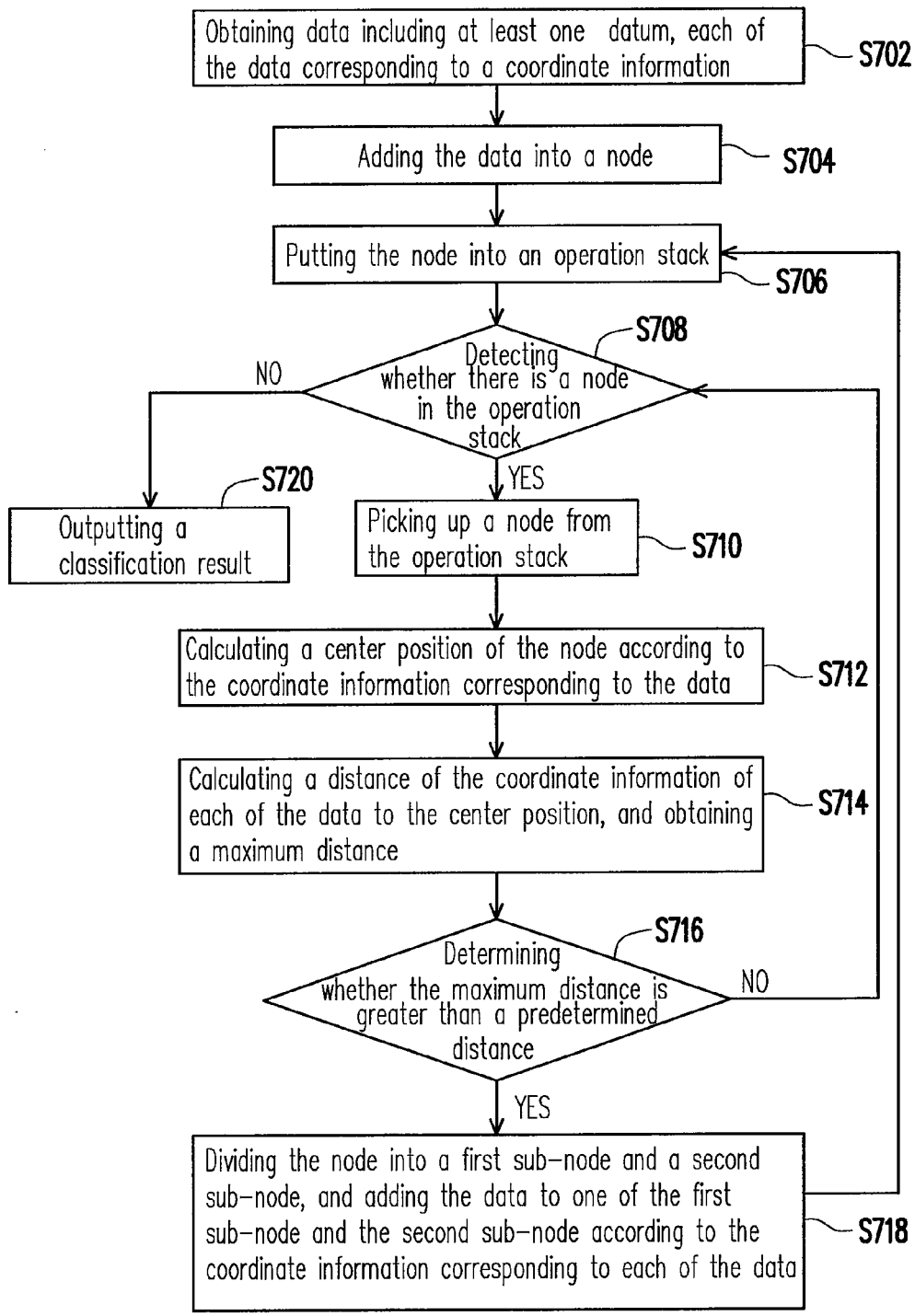
FIG. 7 is a flow chart illustrating a method for building a classification tree according to another embodiment of the present invention.
Figure 8:
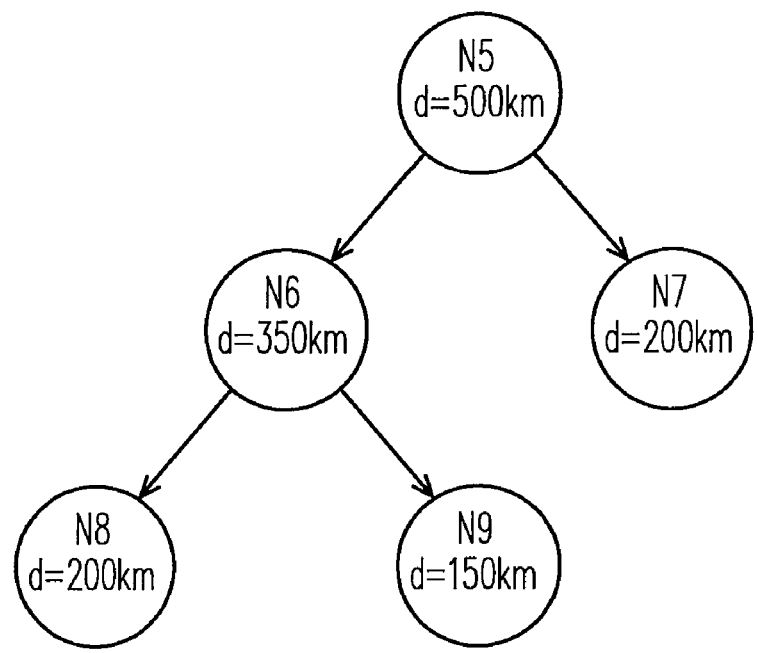
FIG. 8 is a schematic diagram illustrating a classification tree according to an embodiment of the present invention.

FIG. 7 is a flow chart illustrating a method for building a classification tree according to another embodiment of the present invention. FIG. 8 is a schematic diagram illustrating a classification tree according to an embodiment of the present invention. Referring to FIGS. 7 and 8, first, at step S702, data including at least one datum are obtained, in which each datum corresponds to a coordinate information. The coordinate information is, for example, a longitude and a latitude of the datum.

Figures 9A, 9B, 9C:
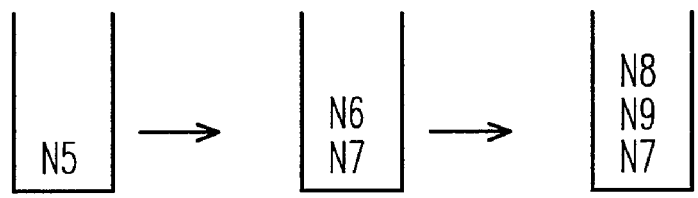
FIGS. 9A through 9C are schematic diagrams illustrating a process of putting a node into an operation stack.

Next, at step S704, each datum is added to a node N5. The node N5, for example, is a root node of the classification tree. Next, at step S706, the node N5 is put into an operation stack as shown in FIG. 9A. At step S708, it is detected whether there is any node in the operation stack. If there is, then at step S710, the node is picked up from the operation stack. In other words, the node N5 is picked up from the operation stack, and therefore, at step S712, a center position of the node N5 is calculated according to the coordinate information of each datum in the node N5.

After obtaining the center position of the node N5, at step S714, distances from coordinate information of all of the data to the center position are calculated, so as to obtain a maximum distance, e.g., 500 km hereby. Next, at step S716, the maximum distance is compared with a predetermined distance. Supposing that the predetermined distance has a value of 300 km, therefore the maximum distance is determined as greater than the predetermined distance, and thus a comparison result of the step S716 is "YES". Therefore, at step S718, the node N5 is divided into sub-nodes N6 and N7, in which the data in the node N5 are added into one of the sub-nodes N6 and N7 according to the coordinate information of each datum. The method of dividing the node N5 into sub-nodes N6 and N7 can be learnt by referring the discussion about FIG. 6, and is not to be iterated hereby. In step S706, the sub-nodes N6 and N7 are taken as new nodes and put into the operation stack, as shown in FIG. 9B.

In step S706, the nodes N6 and N7 have been put into the operation stack. Therefore, in performing the step S708, it would be again detected that there are nodes in the operation stack. The step S710 is performed again, in which the detected nodes are picked up therefrom. In this case, for example, the node N6 is first picked up, and a center position of the node N6 is calculated according to the coordinate information of data in the node N6 at step S712. Next, at step S714, distances from coordinate information of all of the data in the node N6 to the center position are calculated, so as to obtain a maximum distance of the node N6, e.g., 350 km hereby. Next, at step S716, the maximum distance of the node N6 is compared with the predetermined distance. The predetermined distance is 300 km, while the maximum distance of the node N6 is 350 km. Therefore, it is determined to further classify those data in the node N6 by dividing the node N6 into another two sub-nodes N8 and N9, and returning back to the step S706, in which the nodes N8 and N9 are put into the operation stack, as shown in FIG. 9C.

Next, a new round of process including the above steps in the sequences of S708→S710→S712→S714→S716→S718→S706 is conducted to analyse the nodes N7, N8 and N9, and thus determining whether they are needed to be further classified and divided. The round will continue until it is detected that there is no node in the operation stack at the step S708 which initiates a step S720, a classification result is outputted and the building of the classification tree is completed.

If in the following the step S708, it is detected that there is no node in the operation stack, then, at step S720, a classification result is outputted and the building of the classification tree is completed.

Referring to FIG. 8 again, because there is no sub-node under the nodes N7, N8, and N9, the nodes N7, N8, and N9 are named as leaf nodes or external nodes of the classification tree. On the contrary, because the nodes N5 and N6 are further divided into sub-nodes, they are named as non-leaf nodes or internal nodes of the classification tree.

Figure 10:
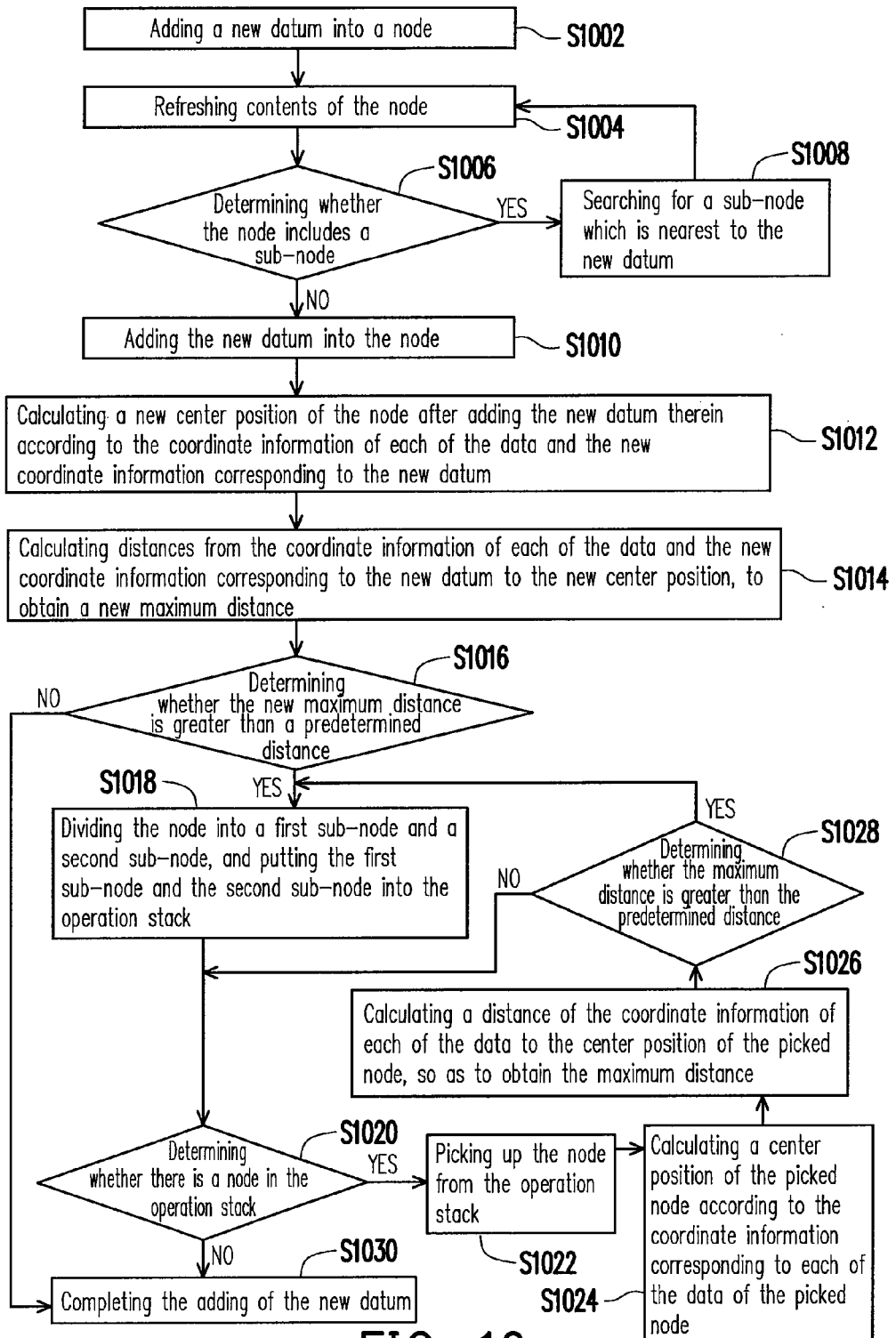
FIG. 10 is a flow chart illustrating a method for building a classification tree according to still another embodiment of the present invention.
Figure 11:
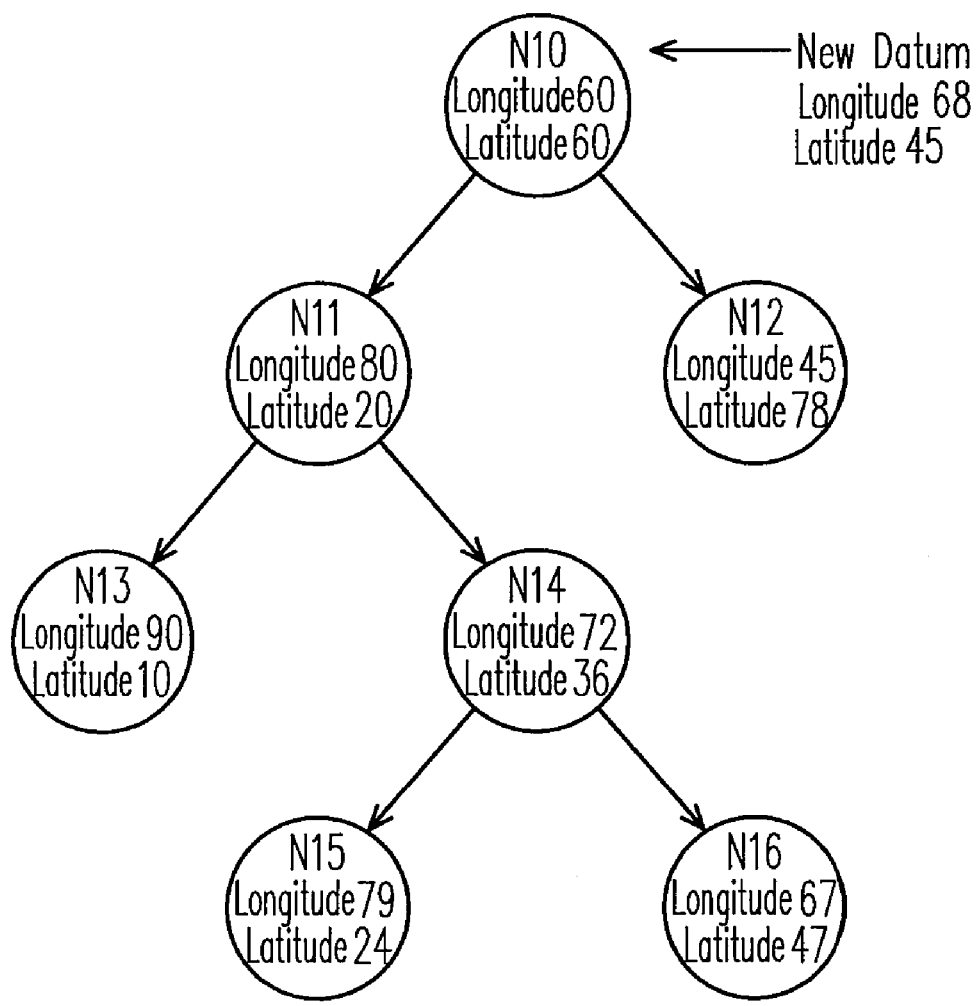
FIG. 11 is a schematic diagram showing putting a data into the classification tree according to an embodiment of the present invention.

The method of building a classification tree is exemplified above. In order to consecutively introduce new data into the classification tree, another embodiment of the present invention is described below for illustrating a process of introducing a new datum thereto. FIG. 10 is a flow chart illustrating a method for building a classification tree according to still another embodiment of the present invention. FIG. 11 is a schematic diagram showing putting a data into the classification tree according to an embodiment of the present invention. Referring to FIGS. 10 and 11, first, at step S1002, a new datum is added into a node N10 including, for example, a center position (longitude 60; latitude of 60), and a coordinate information of the new datum is (longitude 68; latitude of 45). At step S1004, contents of the node N10 are refreshed. At step S1006, it is detected whether there is a sub-node in the node, i.e., N10 hereby.

If it is detected that there is a sub-node in the node N10, then the process enters a step S1008 to search a sub-node which is nearest to the new datum. For example, as shown in FIG. 11, the node N10 is a root node having sub-nodes N11 and N12. The node N11 has a center position (longitude 80; latitude of 20), and the node N12 has a center position (longitude 45; latitude of 78). Therefore, the node N11 is the nearest one to the coordinate information (longitude 68; latitude of 45) of the new datum. Next, at step S1004, contents of the node, i.e., the node N11 hereby, are refreshed. Then, a new round of process including the above steps in the sequence of S1006→S1008→S1004 is conducted. Such process is repetitively conducted until a node N16 (longitude 67; latitude of 47) is found, which is nearest to the new datum, and the node N16 being detected as having no sub-node at a step S1006, and thus at step S1010, the new datum is added into the node N16.

Next, at step S1006, if it is detected that there is no sub-node in the node N10, the procedure directly proceeds to step S1010 to add the new datum into the node. For example, the data are added from the node N10, after performing a process including steps S1004→S1006, if the node N10 has no sub-node, the new datum is directly added into the node N10.

It should be noted that regardless whether the new datum is added to the node N10 or N16, the introduction of the new datum varies the center position of the original node to which the new datum is added. Therefore, the method further includes a step S1012, in which a new center position of the node is calculated according to the coordinate information of each of the original data and new coordinate information of the new datum.

After obtaining the new center position, at step S1014, distances from the coordinate information of each of the original data and new coordinate information corresponding to the new datum to the new center position are calculated to obtain a new maximum distance.

At step S1016, the new maximum distance is compared with the predetermined distance to obtain a comparison result which can be accorded in determining whether the data in the node need to be further classified.

If the comparison result is the new maximum distance is greater than the predetermined distance, then, the node is further divided into a first sub-node and a second sub-node. The first sub-node and a second sub-node are then put into an operation stack. Next, at step S1020, it is detected that whether there is a node in the operation stack. If there is, then at step S1022, the node is picked up from the operation stack. And thereafter, at step S1024, a center position of the node which is picked up from the operation stack is calculated according to the coordinate information of each of the data in the node.

Next, at step S1026, distances from the coordinate information of each of the data in the node are calculated to obtain the maximum distance. And then, at step S1028, the maximum distance obtained at step S1026 is compared with the predetermined distance. If the comparison result is the maximum distance greater than the predetermined distance, then, the process enters a step S1018, the node which is picked up from the operation stack is divided into a first sub-node and a second sub-node. If the comparison result indicates that the maximum distance is smaller than the predetermined distance, then, the process enters into a step S1020 to further detect whether there is any node in the operation stack. And if there is no data detected from the operations stack, the process enters a step S1030, and the introduction of the new datum to the classification tree is completed. In the process including the steps from S1016 through S1028, the analysis to the nodes and the determination of whether to further classify can be learnt by referring to the above embodiments and are not to be iterated hereby.

If the comparison result of step S1016 is the maximum distance smaller than the predetermined distance, then, the process enters a step S1030, the introduction of the new datum to the classification tree is completed.

After building the classification tree, the user is allowed to set up a restriction condition for searching for and previewing desired data. The user may preferably select data information recorded by the data as the restriction condition. For example, a data amount in the node, the maximum distance in the node, and an importance ranking of the node may be selected as the restriction condition for searching. Embodiments are to be given below for illustrating the application of built classification tree.

Figure 12:
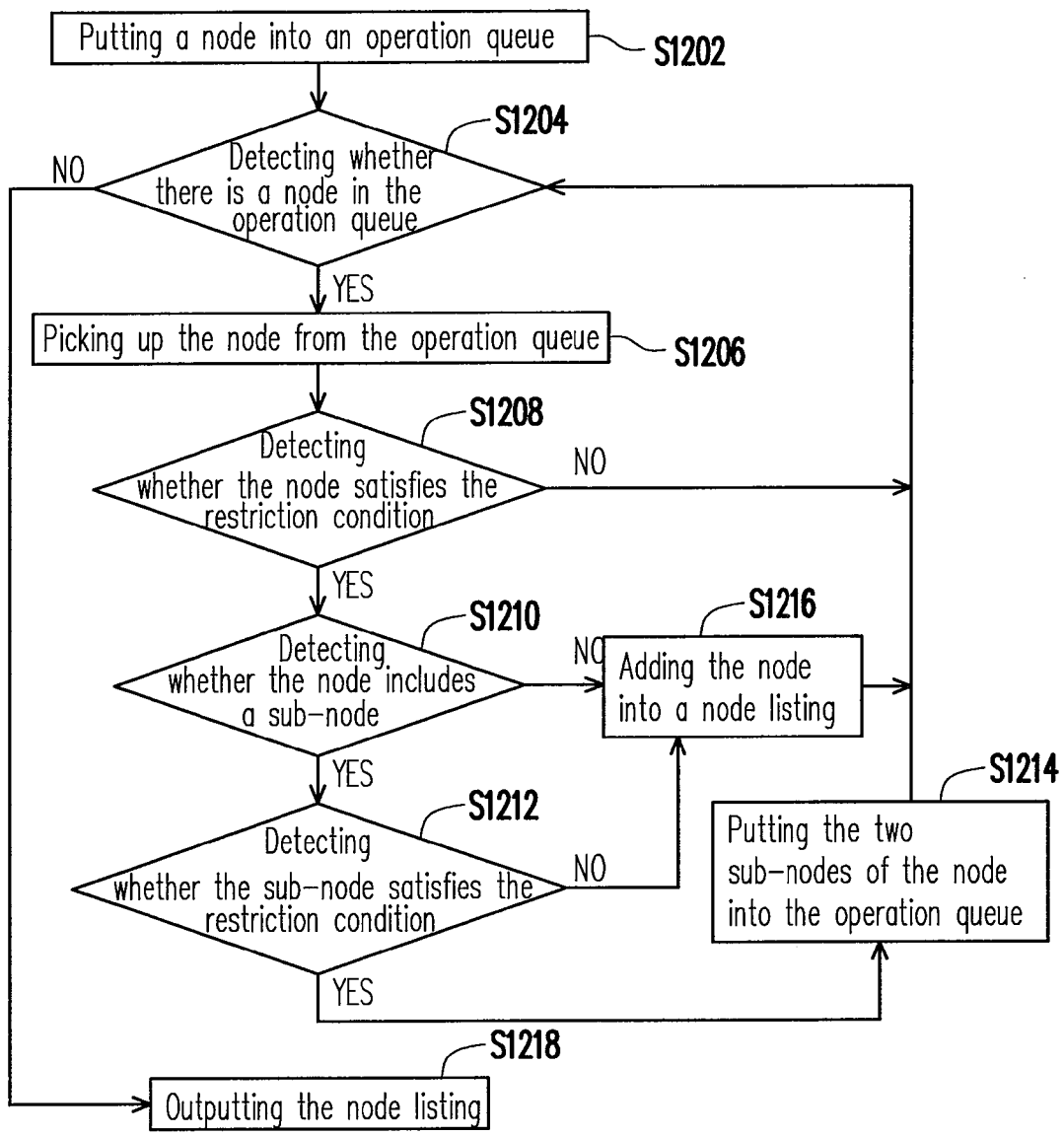
FIG. 12 exemplifies an application of the classification tree according to an embodiment of the present invention.
Figure 13:
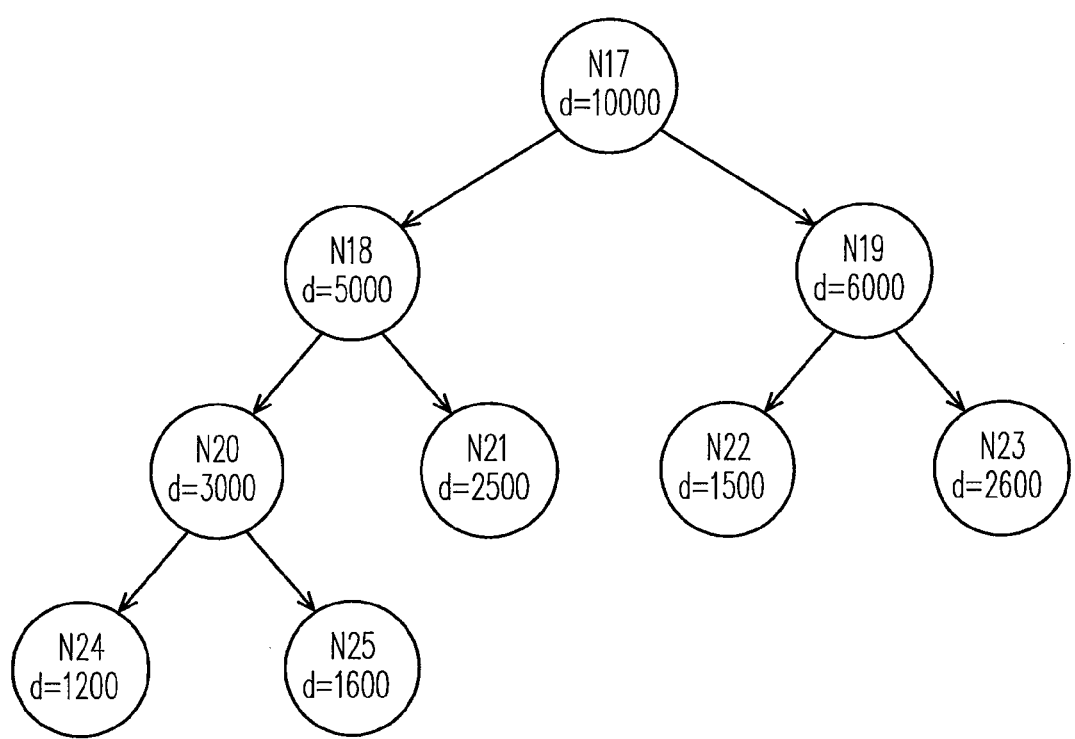
FIG. 13 is a schematic diagram illustrating a classification tree in conjunction with the embodiment of FIG. 12.

FIG. 12 exemplifies an application of the classification tree according to an embodiment of the present invention. FIG. 13 is a schematic diagram illustrating a classification tree in conjunction with the embodiment of FIG. 12. Referring to FIGS. 12 and 13 together, first, the user provides restriction condition such as "listing all nodes which maximum distance d>2000", then at step S1202, the data classification system 200 puts a node into an operation queue, e.g., a node N17 is put into the operation queue, in which the maximum distance of the node N17 d=10000.

Next, at step S1204, it is detected whether there is a node in the operation queue. Since there is already the node N17 put into the operation queue, it must be detected that there is a node, i.e., N17 in the operation queue, corresponding to a detecting result of "YES". Therefore, at step S1206, the node, i.e., N17 hereby, is picked up from the operation queue.

Next, at step S1208, it is detected whether the node N17 satisfies the restriction condition. Because the maximum distance of the node N17 d=10000, the node N17 satisfies the restriction condition (d>2000), and thus the process enters step S1210, in which it is detected that whether there is a sub-node in the node, i.e., N17. As exemplified herein, the node 17 further includes nodes N18, and N19, which means that the node further includes sub-nodes. In this case, the process enters step S1212, to detect whether the sub-nodes satisfy the restriction condition, that is, to detect whether the nodes N18 and N19 satisfy the restriction condition. As shown in FIG. 13, the maximum distances of N18 and N19 are respectively d=5000 and d=6000, and thus the nodes N18 and N19 both satisfy the restriction condition. Accordingly, the process further enters step S1214 to put the nodes N18 and N19 into the operation queue. Thereafter, the process enters the step S1204 again to detect whether there is a node in the operation queue.

As exemplified therein, the node N18 further includes nodes N20 and N21, while the maximum distances of the nodes N20 and N21 are respectively d=3000 and d=2500, which all satisfy the restriction condition. Therefore, at the step S1206, after picking up the node N18 from the operation queue, a new round including the steps S1208→S1210→S1212→2S1214 is then conducted to put the nodes N20 and N21 into the operation queue.

In this case, there are three nodes N19, N20 and N21 in the operation queue. The node N19 further includes nodes N22 and N23, and maximum distances of the nodes N22 and N23 are respectively d=1500 and d=2600. The node N22 does not satisfy the restriction condition, while the node N23 does. Therefore, at step S1206, the node N19 is picked up from the operation queue, and the steps sequence S1208→S1210→S1212 are conducted, where the node N22 can be detected as not satisfying the restriction condition. And therefore, the process enters step S1216 to put the node N19 into the node listing. Thereafter, the process returns to the step S1204 to further detect whether there is a node in the operation queue.

In this time, the operation queue can be detected as including two nodes N20 and N21. The node N20 further includes nodes N24 and N25, while maximum distances of the nodes N24 and N25 are respectively d=1200 and d=1600. None of the nodes N24 and N25 satisfies the restriction condition. Thus, at step S1206, after picking up the node N20, the process conducts the steps sequence S1208→S1210→S1212, where the nodes N24 and N25 can be detected as not satisfying the restriction condition. And therefore, the process enters step S1216 to put the node N20 into the node listing. Thereafter, the process returns to the step S1204 to further detect whether there is a node in the operation queue.

In this case, there is still one node N21. However, the node N21 has no sub-node. Therefore, at step S1206, after picking up the node N21, the process conducts the steps sequence S1208→S1210, where the node N21 can be detected as having no sub-node. Therefore, the process enters the step S1216 to put the node N21 into the node listing. Thereafter, the process returns to the step S1204 to further detect whether there is a node in the operation queue.

Up to now, there is no node in the operation queue. Therefore, at step S1204, it is detected that there is no node in the operation queue, indicative of "NO" in step S1204. Accordingly, the step S1218 is conducted to output the nodes in the node listing, i.e., nodes N19, N20, and N21 hereby.

If the detection result in step S1204 is "NO", then the step S1218 is directly conducted to output the nodes in the node listing.

According to the foregoing embodiment, the maximum distance in the node is exemplified for illustration as a restriction condition. However, it should be noted that the present invention is not restricted to use the same as the restriction condition only. Other features, e.g., data amount in the node, or importance ranking of the node can also alternatively be selected as restriction conditions. The process using them as restriction conditions for searching is similar with the process of FIG. 12, and thus is not to be iterated hereby.

Further, according to the present embodiment of the present invention, if the data amount is taken as a restriction condition, the node listing only lists all nodes satisfying the restriction condition of data amount. If the maximum distance in the node is taken as a restriction condition, the node listing only lists all nodes satisfying the restriction condition of the maximum distance in the node. In such a way, the nodes given by the node listing can be evenly distributed on the map. However, when the importance ranking of the node is taken as a restriction condition, the node listing only may list those nodes having a higher click rate or considered by the administrator as important.

Figure 14:
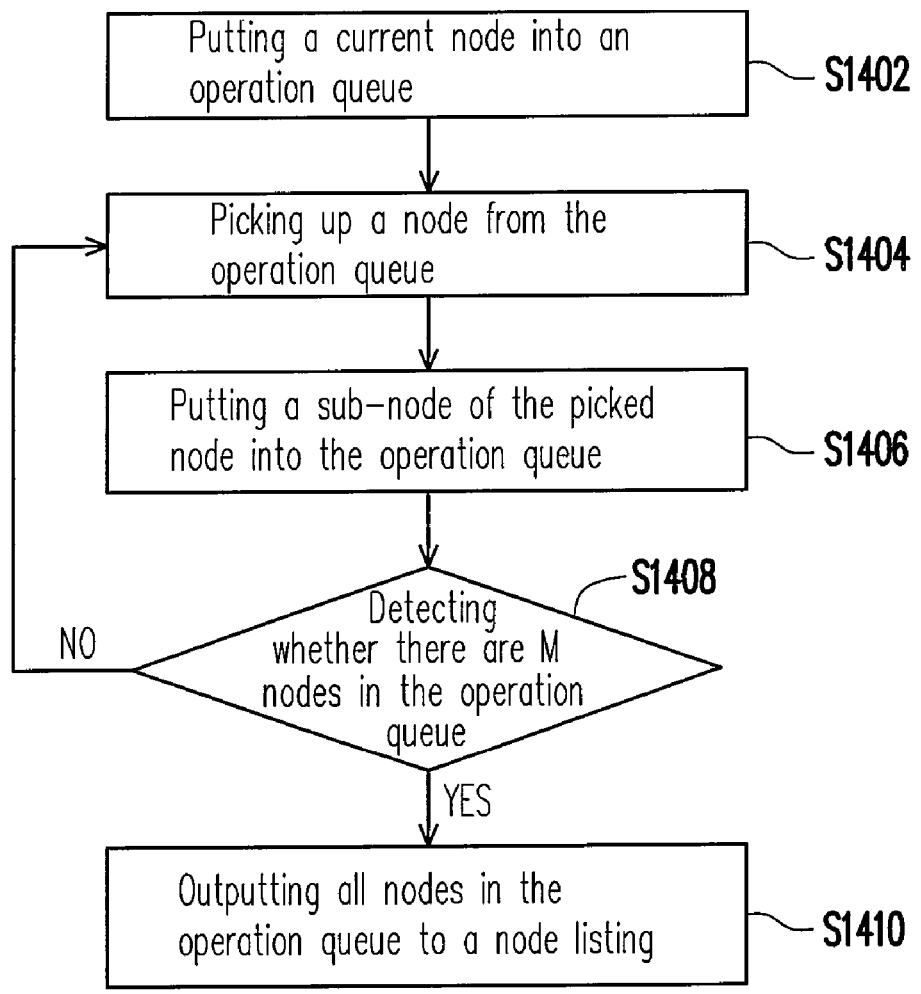
FIG. 14 exemplifies an application of the classification tree according to another embodiment of the present invention.
Figure 15:
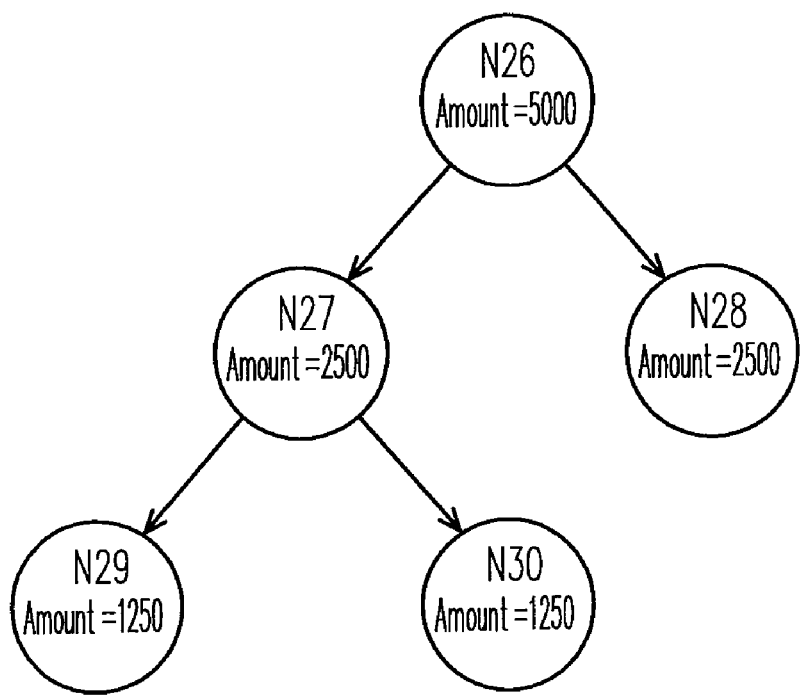
FIG. 15 is a schematic diagram illustrating a classification tree in conjunction with the embodiment of FIG. 14.

Further, it is usual that when data in a predetermined node are selected, the user may like to view M sub-nodes having most data, in which M is an integer greater than 0. Below, an embodiment is given for illustrating this application. The value of M is, for example but not limited, 3. FIG. 14 exemplifies an application of the classification tree according to another embodiment of the present invention. FIG. 15 is a schematic diagram illustrating a classification tree in conunction with the embodiment of FIG. 14. Referring to FIGS. 14 and 15, when a user selects a predetermined node and restricts to view three sub-nodes (M=3) having most data, the data classification system 200, at step S1402, puts the current node, e.g., node N26, which is selected by the user into the operation queue. Next, at step S1404, the node, i.e., node N26, is picked up from the operation queue. And then, at step S1406, two sub-nodes, i.e., nodes N27 and N28, of the node N26 are put into the operation queue.

Next, at step S1408, it is determined that whether there are three nodes in the operation queue. In this case, there are two nodes, N27 and N28, in the operation queue, therefore, in the step S1408, it is detected that there are less than three nodes in the operation queue. In this case, the process returns to the step S1404 to pick up a node from the operation queue. At this time, at step S1406, the node N27 is picked up from the operation queue, and sub-nodes, i.e., N29 and N30 hereby, of the node N27 are put into the operation queue. Therefore, the operation queue now contains nodes N28, N29 and N30. And, at the step S1408, it will be determined that there are three nodes in the operation queue. Accordingly, the process enters step S1410 to output the nodes, i.e., nodes N28, N29 and N30, in the operation queue to a node listing. In such a way, the user can learn that the nodes N28, N29 and N30 are three sub-nodes of the node N26, having most data.

For more accurately searching data, the user often restricts the type of the data or the building time of the data in searching data from a predetermined node. An embodiment related thereto is described for illustration purpose.

Figure 16:
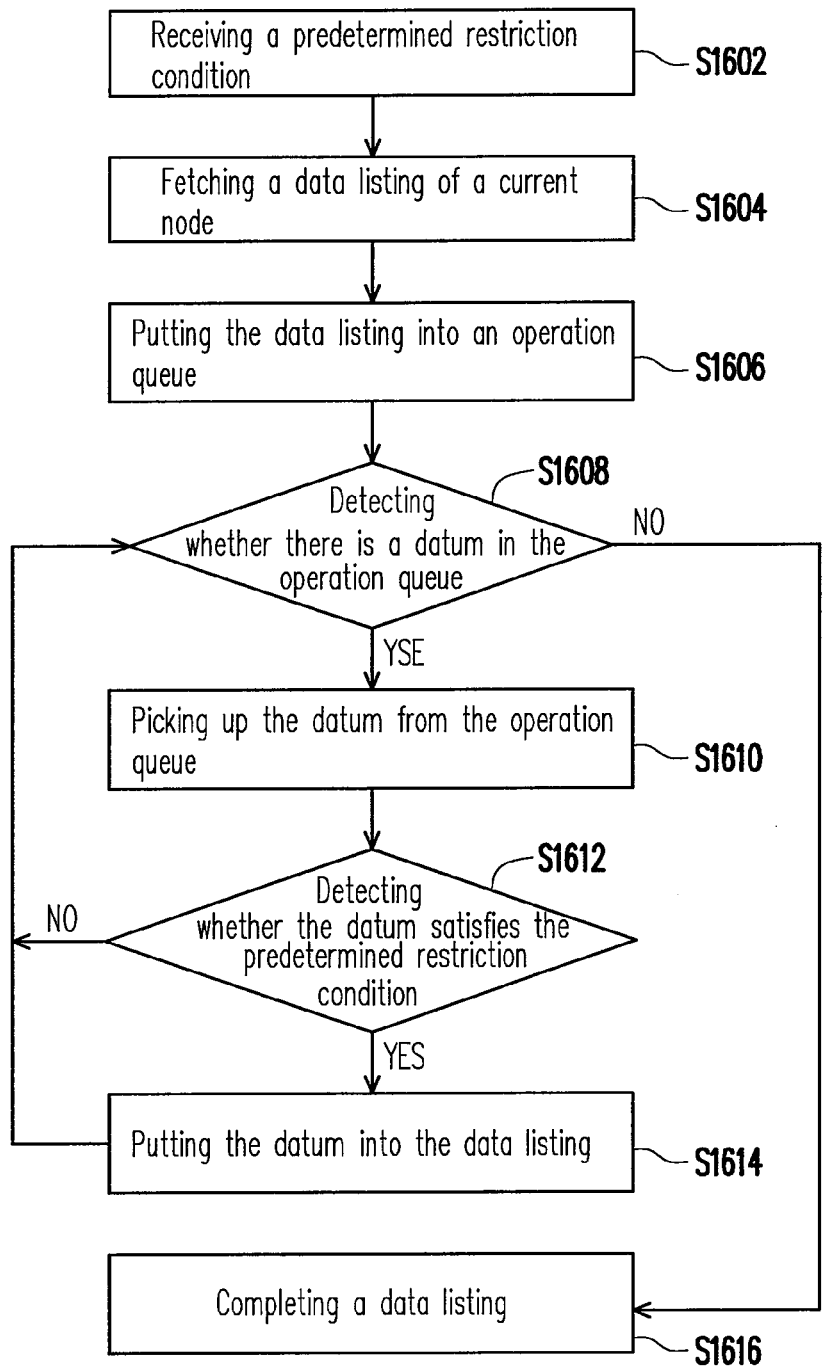
FIG. 16 exemplifies an application of the classification tree according to still another embodiment of the present invention.
Figure 17:
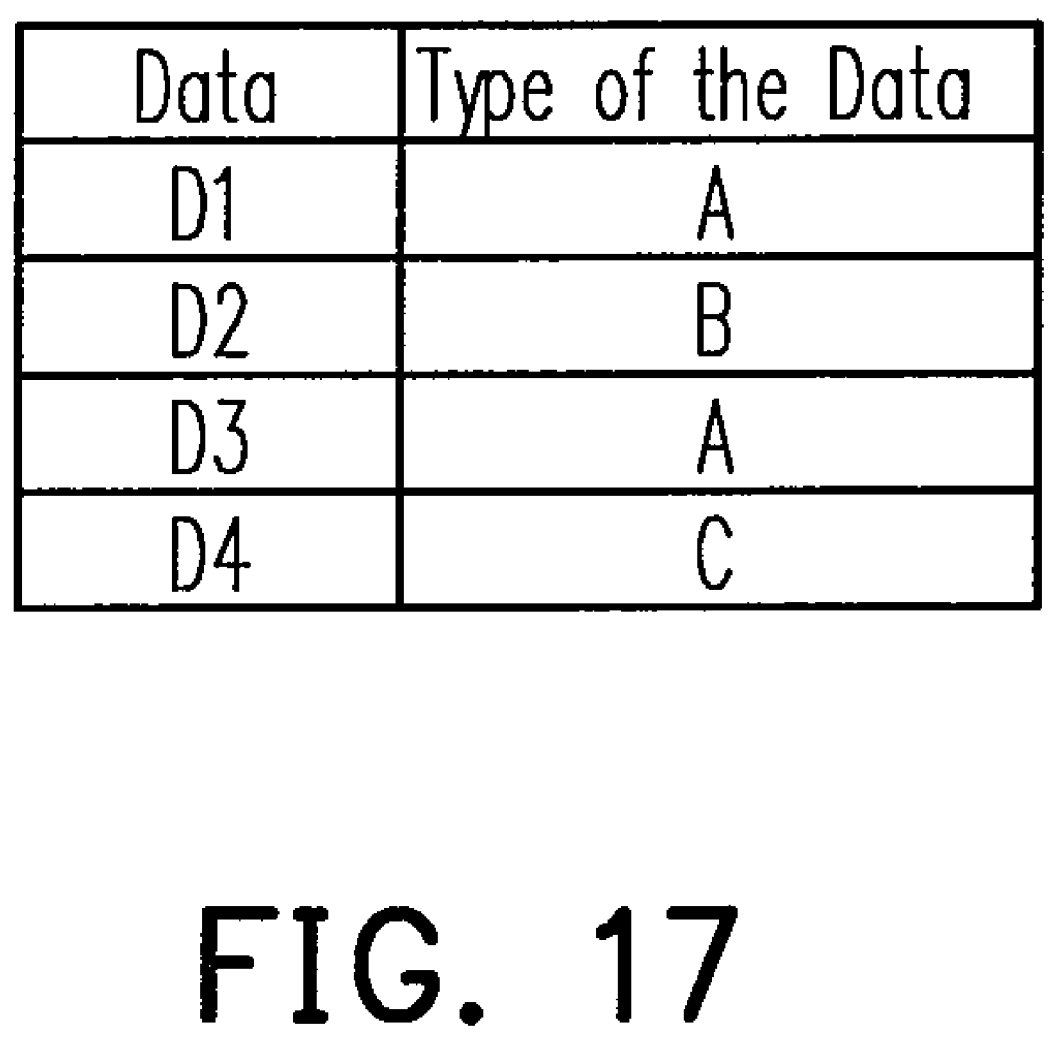

FIG. 16 exemplifies an application of the classification tree according to still another embodiment of the present invention. Referring to FIG. 16, first, at step S1602, the data classification system 200 receives a predetermined restriction condition, for example, restricting the data to be of a type A. Next, at step S1604, the data classification system 200 fetches the data listing of the current node. FIG. 17 is a schematic diagram illustrating an amount and types of data included in a node according to an embodiment of the present invention. In the current embodiment, as shown in FIG. 17, the data listing includes data amounts and data types. Next, at step S1606, the data listing, i.e., D1 through D4 hereby, is put into an operation queue. And at step S1608, it is determined whether there is a datum in the operation queue.

If it is determined that there is a datum in the operation queue, at step S1610, a datum is fetched from the operation queue, i.e., the datum D1 is fetched from the operation queue. Next, at step S1612, it is further determined that whether the datum D1 satisfies the predetermined restriction condition. Since the datum D1 is an A type datum, and thus satisfies the predetermined restriction condition. Accordingly, at the step S1614, the datum D1 is added into a data listing. Next, the process returns back to the step S1608 to detect whether there is a datum in the operation queue again.

In this case, there are still three data D2, D3 and D4 in the operation queue. Therefore, the process enters the step S1610 once again, in which the datum D2 is fetched to perform the step S1612. The datum D2 is a B type datum, and thus does not satisfy the predetermined restriction condition. Accordingly, the process returns to the step S1608 for consecutively detecting whether there is a datum in the operation queue, and continues until it is determined that there is no datum in the operation queue. Therefore, the process enters step S1616 and completes the data listing.

The datum D3 is an A type datum, and the datum D4 is a C type datum. Therefore, when the data listing is completed, D1 and D3 are presented in the data listing, so as to allow the user to know that data D1 and D3 satisfy the predetermined restriction condition.

In summary, the present invention builds a classification tree by classifying in a manner of a tree structure, e.g., a binary tree, according to coordinate information recorded in the data. In other words, data added in the node can be divided into two groups according to the coordinate information of the data. The two groups are added to two sub-nodes respectively. Similarly, data in each sub-node can be further divided into two groups, and so on until each sub-node containing only one datum or otherwise a distance from each datum in the sub-node to a center position being smaller than a predetermined distance. In such a way, the classification tree built according to the present invention provides a hierarchical structure which is adapted to provide an optimal writing/reading speed for applications in information browsing and searching according to the coordinate information, and accelerate the searching speed. Further, the present invention is also adapted to search data corresponding to predetermined searching conditions according to the data information of the data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data classification system, comprising:
   a fetch unit, for receiving data including at least one datum, and fetching a data information contained in the data, wherein the data information comprises a coordinate information, and the coordinate information comprises a longitude and a latitude;
   a classification tree module, for classifying the data in a manner of a tree structure according to the data information, and building a classification tree, wherein the classification tree comprises a plurality of nodes, each comprising a center position, a maximum distance of the data in the node to the center position; and
   a data repository, for storing the classification tree and the data,
   wherein the classification tree module obtains the data and adds it into a node, then calculates the center position of the node according to the coordinate information corresponding to the data, a distance of the coordinate information of each of the data to the center position, and obtains the maximum distance, thereafter determines whether the maximum distance is greater than a predetermined distance, if the maximum distance is greater than the predetermined distance, the classification tree module calculates a maximum longitude difference and a maximum latitude difference of the data according to the longitude and the latitude of each of the data, if the maximum longitude difference is greater than the maximum latitude difference the classification tree module arranges all data according to the longitudes thereof, and takes a longitude median of the data as a center to divide the node into a first sub-node and a second sub-node, and if the maximum longitude difference is smaller than the maximum latitude difference, the classification tree module arranges all data according to the latitudes thereof, and takes a latitude median of the data as a center to divide the node into the first sub-node and the second sub-node.

2. The data classification system according to claim 1, wherein the data information of the data comprises a building time, a type, a description, an importance ranking and a storage position reference information of the data.

3. The data classification system according to claim 1, wherein the classification tree comprises a data amount in the node, an importance ranking of the node, data listing in the node, a description of the node, and sub-nodes of the node.

4. The data classification system according to claim 1, wherein the data amount in the data is represented by a size of the node, and an importance ranking of the data is represented by different colors.

5. A method for building the classification tree, preformed by a data classification system configured with a classification tree module, the method comprising:
   obtaining, by a processor, data including at least one datum, each of the data corresponding to a coordinate information, and the coordinate information comprises a longitude and a latitude of each of the data;
   adding the data into a node;
   calculating a center position of the node according to the coordinate information corresponding to the data;
   calculating a distance of the coordinate information of each of the data to the center position, and obtaining a maximum distance;
   determining whether the maximum distance is greater than a predetermined distance; and
   dividing the node into a first sub-node and a second sub-node if the maximum distance is greater than the predetermined distance, and adding the data to one of the first sub-node and the second sub-node according to the coordinate information corresponding to each of the data, wherein the step of dividing the node into the first sub-node and the second sub-node comprises:

calculating a maximum longitude difference and a maximum latitude difference of the data according to the longitude and the latitude of each of the data;

arranging all data according to the longitudes thereof if the maximum longitude difference is greater than the maximum latitude difference, and taking a longitude median of the data as a center to divide the node into the first sub-node and the second sub-node; and arranging all data according to the latitudes thereof if the maximum longitude difference is smaller than the maximum latitude difference, and taking a latitude median of the data as a center to divide the node into a first sub-node and a second sub-node.

6. The method for building the classification tree according to claim 5, wherein the step of determining whether the maximum distance is greater than the predetermined distance comprises a step of directly outputting a classification result if the maximum distance is not greater than the predetermined distance.

7. The method for building the classification tree according to claim 5, further comprising:
putting the node into an operation stack;
detecting whether there is a node in the operation stack; and
picking up a node from the operation stack if it is detected that there is the node in the operation stack, and conducting the step of calculating a center position of the node according to the coordinate information corresponding to the data.

8. The method for building the classification tree according to claim 7, wherein after the step of dividing the node into the first sub-node and the second sub-node further comprises a step of putting the first sub-node and the second sub-node into an operation stack.

9. The method for building the classification tree according to claim 7, further comprising:
adding a new datum into a node, wherein the new datum corresponds to a new coordinate information;
refreshing contents of the node;
determining whether the node includes a sub-node;
adding the new datum into the node if the node dose not include a sub-node;
calculating a new center position of the node after adding the new datum therein according to the coordinate information of each of the data and the new coordinate information corresponding to the new datum;
calculating distances from the coordinate information of each of the data and the new coordinate information corresponding to the new datum to the new center position, to obtain a new maximum distance;
determining whether the new maximum distance is greater than the predetermined distance;
dividing the node into the first sub-node and the second sub-node if the new maximum distance is greater than the predetermined distance, and putting the first sub-node and the second sub-node into the operation stack, and adding each of the data and the new datum into one of the first sub-node and the second sub-node according to the coordinate information of each of the data and the new coordinate information corresponding to the new datum;
determining whether there is a node in the operation stack; and
completing the adding of the new datum if there is no node in the operation stack.

10. The method for building the classification tree according to claim 9, wherein the step of determining whether the node includes a sub-node further comprises:

searching for a sub-node which is nearest to the new datum according to the new coordinate information if it is determined that the node includes a sub-node; and
returning to refreshing contents of the sub-node.

11. The method for building the classification tree according to claim 9, wherein the step of determining whether the new maximum distance is greater than the predetermined distance further comprises a step of completing the adding of the new datum if it is determined that the new maximum distance is not greater than the predetermined distance.

12. The method for building the classification tree according to claim 9, wherein the step of determining whether there is a node in the operation stack further comprises:
picking up the node from the operation stack if there is a node in the operation stack;
calculating a center position of the picked node according to the coordinate information corresponding to each of the data of the picked node;
calculating a distance of the coordinate information of each of the data to the center position of the picked node, so as to obtain the maximum distance;
determining whether the maximum distance is greater than the predetermined distance;
entering the step of dividing the node into the first sub-node and the second sub-node if it is determined that the maximum distance is greater than the predetermined distance, and putting the first sub-node and the second sub-node into the operation stack; and
entering the step of determining whether there is a node in the operation stack if it is determined that the maximum distance is not greater than the predetermined distance.

13. The method for building the classification tree according to claim 7 further comprising:
providing a restriction condition;
putting a node into an operation queue;
detecting whether there is a node in the operation queue;
picking up the node if there is the node in the operation queue;
detecting whether the node satisfies the restriction condition;
detecting whether the node includes a sub-node if it is detected that the node satisfies the restriction condition;
detecting whether the sub-node satisfies the restriction condition if it is detected that the node includes a sub-node; and
putting the sub-node of the node into the operation queue.

14. The method for building the classification tree according to claim 13, wherein the step of detecting whether the node includes a sub-node further comprises putting the node into a node listing if it is detected that the node does not include a sub-node.

15. The method for building the classification tree according to claim 13, wherein the step of detecting whether the sub-node satisfies the restriction condition further comprises a step of adding the node into a node listing if it is detected that the sub-node does not satisfy the restriction condition.

16. The method for building the classification tree according to claim 13, wherein the step of detecting whether there is a node in the operation queue further comprises a step of outputting nodes of a node listing if it is detected that there is no node in the operation queue.

17. The method for building the classification tree according to claim 7, further comprising:
putting a current node into an operation queue;
picking up a node from the operation queue;
putting a sub-node of the picked node into the operation;

detecting whether there are M nodes in the operation queue, wherein M is an integer greater than 0;

outputting all nodes in the operation queue to a node listing if there are M nodes in the operation queue; and returning back to a step of picking up a node having most data from the operation queue if there are less than M nodes in the operation queue.

18. The method for building the classification tree according to claim 7, further comprising:

receiving a predetermined restriction condition;

fetching a data listing of a current node;

putting the data listing into a operation queue;

detecting whether there is a datum in the operation queue;

picking up the datum from the operation queue if it is detected that there is a datum in the operation queue;

detecting whether the datum satisfies the predetermined restriction condition; and putting the datum into the data listing if the datum satisfies the predetermined restriction condition.

19. The method for building the classification tree according to claim 18, wherein the step of detecting whether there is a datum in the operation queue further comprises a step of completing a data listing if it is detected that there is no datum in the operation queue.

20. The method for building the classification tree according to claim 18, wherein the step of detecting whether the datum satisfies the predetermined restriction condition further comprises detecting whether there is a datum in the operation queue if it is detected that the datum does not satisfy the predetermined restriction condition.

* * * * *